United States Patent [19]

Allen

[11] 4,032,716

[45] * June 28, 1977

[54] MEASUREMENT OF NOISE IN A COMMUNICATION CHANNEL

[75] Inventor: Edgar Robert Allen, Stanmore, England

[73] Assignee: The Post Office, London, England

[ * ] Notice: The portion of the term of this patent subsequent to June 17, 1992, has been disclaimed.

[22] Filed: May 23, 1975

[21] Appl. No.: 580,349

[30] Foreign Application Priority Data

May 30, 1974 United Kingdom ............ 24013/74

[52] U.S. Cl. .................... 179/15 BF; 179/175.3 R; 324/57 N

[51] Int. Cl.² ............................................ H04J 1/16

[58] Field of Search ................ 179/15 BF, 175.3 R; 324/57 N; 325/67, 133, 363

[56] References Cited

UNITED STATES PATENTS

| | | | |
|---|---|---|---|
| 2,987,586 | 6/1961 | Berger | 179/15 BF X |
| 3,586,993 | 6/1971 | Buck | 179/15 BF X |
| 3,683,282 | 8/1972 | D'Amato | 325/363 |
| 3,691,306 | 9/1972 | Molo | 179/15 BF |
| 3,890,470 | 6/1975 | Allen | 179/15 BF |

Primary Examiner—David L. Stewart
Attorney, Agent, or Firm—Cushman, Darby & Cushman

[57] ABSTRACT

A measure of the noise performance of an FDM system can be made by making measurements when the system is carrying traffic. The technique consists of creating a quiet channel in the system, and measuring the noise level in this quiet channel. The tester operates by Tee-ing off the broad band incoming signal, automatically attenuating the broad band signal to a predetermined level, and then measuring the power level in a narrow bandwidth lying within a single channel. The measurement is performed using an automatic attenuator controlled by a feedback loop containing, band pass filters, superhetrodyne detectors, a comparator controlling a counter, which in turn controls the automatic attenuator.

7 Claims, 5 Drawing Figures

MEASUREMENT OF NOISE IN A COMMUNICATION CHANNEL

This invention relates to a method of and apparatus for assessing the noise performance of a frequency multiplex multi-channel communications link.

In a communications system it is frequently necessary to transmit a large volume of information between two particular points. This may be achieved by frequency division multiplexing (FDM), the information to be transmitted between two points. This means that there are a plurality of information carrying channels each with its own associated frequency range existing between the two points. The noise on the signal received at one of the points can originate in three basic ways, namely:

1. It can be already present in the signal transmitted from the other point.
2. It can be noise of a fundamental nature, e.g. quantum noise, Johnson noise, etc.,
3. It can be caused by cross-modulation and intermodulation between the different information channels.

The noise under headings (2) and (3) is dependent on the performance of the communication link existing between the two points. The noise under heading (1) can in no way be influenced by the performance of the communications link. To ensure optimum performance of the system it is thus important to monitor noise of types (2) and (3) in a communications link. The noise level introduced by the communications link is advantageously represented by the ratio of noise level introduced by the link to the mean signal level received over the link. An internationally recognised parameter which is representative of this ratio is the NPR or noise power ratio of the system. This is defined as the ratio of the part of the noise (including inherent and intermodulation) representing a multi-channel signal that occurs in a narrow bandwidth, to the inherent and intermodulation noise in the same bandwidth when signals are not applied to that band but are applied over the remainder of the multi-channel frequency range.

The NPR is usually measured by feeding white noise of suitable bandwidth and level to simulate a fully loaded system over the communications link, i.e. white noise is applied across all the channels in the link. A quiet bandwidth within a channel may be simulated by inserting a narrow band stop filter in the output of the white noise generator, the noise in the frequency range of the band stop filter is measured with and without the filter and the ratio of the measurements gives the NPR for that particular channel. It is customary to measure NPR in three widely separated bandwidths.

In order to measure NPR in this manner it is necessary to take the communications link out of commission for normal communication for the duration of the measurements which procedure can result in a communications link of 1,800 or more channels being out of commercial service for up to three hours. NPR measurements made in this fashion are expensive to carry out both in terms of technician time and lost revenue. It would thus be advantageous if NPR, or a parameter which is substantially equivalent to NPR, could be measured without the need to take a communications link out of service. Since the measurement of NPR requires the introduction and transmission of white noise to and over the communications link, NPR cannot itself be measured in this way. However, the frequency characteristic of the traffic on, say a telephone, communications link is substantially equivalent to white noise, it is, therefore, proposed to use existing traffic conditions, preferably peak traffic as a substitute for white noise.

It has been suggested, see CCIR recommendation 398-2, published 1970, that noise measurements be made in actual traffic conditions. However, these measurements are made at frequencies above and below, not in, the bandwidth occupied by the multiplex signal. In addition some communication systems use stop filters to remove all signals having frequencies below the bandwidth of the multiplex signal. Thus this particular technique leads only to the measurement of noise at one, or at the most two, frequencies, both of which lie outside the frequency bandwidth of particular interest. In addition these measurements must of necessity be made under conditions of assymetric noise loading.

The present invention proposes the making of noise measurements actually within the bandwidth of the multiplex signal. This enables several measurements, in the case of the preferred embodiment 3, to be made at different frequencies across the bandwidth of the multiplex signal, allowing assessment of the effect of frequency in these bands on noise. In addition because the measurements are made in-band, the noise loading is symetric and gives a better indication of the noise on a channel in use.

The present invention seeks to provide a method of and apparatus for measuring TNR (traffic noise ratio), which is defined as the ratio of the portion of the noise representing a multi-channel signal that occurs in a narrow bandwidth (including inherent, and intermodulation) to the noise in the same bandwidth, in the absence of a traffic signal in that bandwidth. TNR is a function of traffic loading.

In order to measure TNR it is necessary to have only a single information channel out of commission (quiet), when the measurements are made, to make the measurement in that channel. In practice it may be advantageous to maintain, say three, permanently quiet channels in the communications link, i.e. dedicated channels, or alternatively guard channels between super groups or hyper-groups.

Numerical values of TNR measured under peak traffic conditions are found for practical purposes to be substantially equal, numerically, to NPR values for the same system.

The present invention is an improved and modified version of the inventions disclosed in our co-pending application Ser. No. 423,809.

According to a first aspect of the present invention there is provided a method of assessing the noise performance of a FDM (frequency division multiplex) communications link over when an FDM signal is transmitted, said method comprising the steps of:

a. isolating, when said communications link is carrying traffic, a quiet channel having a first bandwidth, located within the bandwidth of said FDM signal,
b. extracting a portion of FDM signal,
c. attenuating said portion of said FDM signal, over a second bandwidth including said quiet channel, to a predetermined power level, said second bandwidth substantially greater than said first bandwidth, and d. measuring the power level in a third bandwidth, located within said quiet channel, said third bandwidth being less than said first bandwidth.

According to a second aspect of the present invention there is provided apparatus for assessing the noise performance of a FDM (frequency division multiplex) communications link over which a FDM signal is transmitted, said apparatus comprising:
 a. input terminal means for extracting a small fraction of the FDM signal,
 b. first automatic attenuator means controlled by a first feed back loop connected to an output of said input terminal means, for attenuating said FDM signal to a predetermined level over a broad bandwidth,
 c. bandwidth limiting means connected via a second automatic attenuator means to an output of said first automatic attenuator means for passing a bandwidth located within a communications channel, and
 d. power measuring means connected to an output of said bandwidth limiting means, including said second automatic attenuator means, for measuring a noise signal at an output of said bandwidth limiting means.

The term power as herein used is to be interpreted as referrring to any signal parameter functionally related to the energy carried by said signal in unit time.

Embodiments of the invention will now be described, by way of example, with reference to the accompanying drawings in which.

Figure 1:
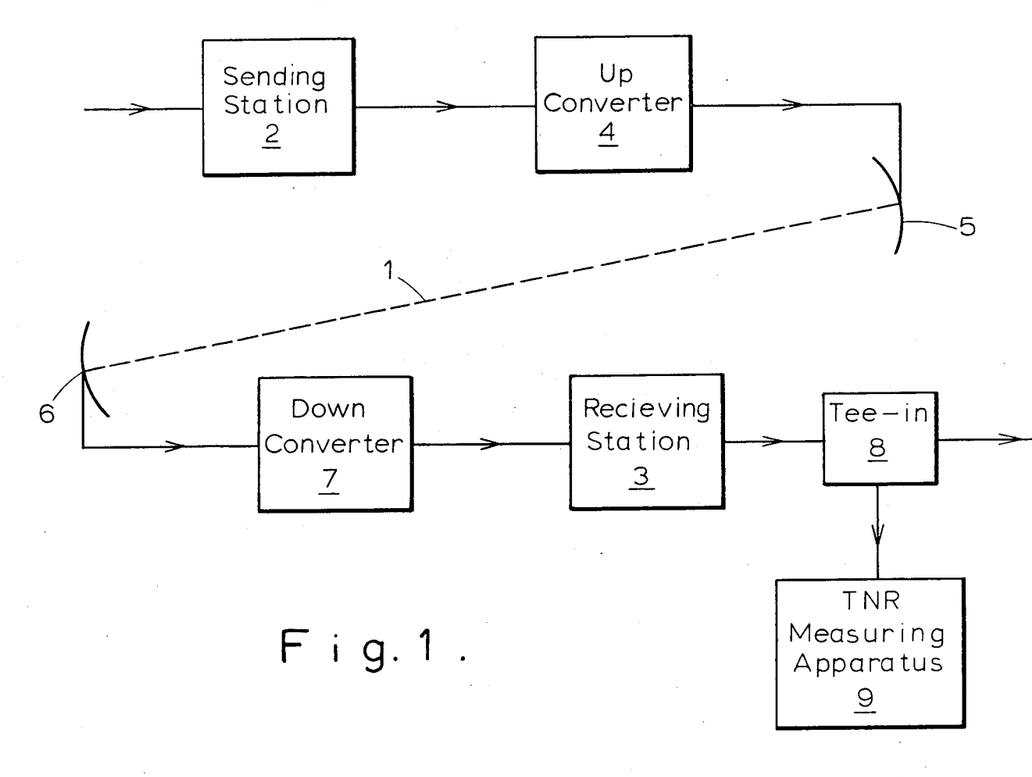
FIG. 1 shows schematically part of a microwave system including a communications link.

Referring now to the drawings and FIG. 1 in particular there is shown a microwave link 1 extending between two points in the system. The points are located at a sending station 2 and a receiving station 3 respectively. The output of sending station 2 is transmitted via an up converter 4 and thence via a waveguide to aerial 5. The microwave signal is then transmitted via a series of microwave repeaters (not shown) to a receive aerial 6. The receive signal, is coupled via waveguide to down converter 7 where it is converted to an intermediate frequency (70 MHz). The output from the down converter 7 is then passed to receiving station 3 where it is converted to baseband (0 to 10 MHz for 1,800 channels or 0–12 MHz for 2,700 channels, or 0–4 MHz for 960 channels). The output of the receiving station 3 is then passed to a repeater and thence possibly to an exchange. Apparatus 9 for measuring the TNR is connected via a T-in 8 to the output of receiving station 3.

The TNR measuring apparatus assesses the noise performance of the communication link by enabling the noise level in a predetermined bandwidth on a quiet channel to be measured with reference to the mean traffic level. The TNR measuring apparatus enables predetermined bandwidths in a number of different channels to be selectively isolated and includes a digital noise level measuring meter.

Figure 2:
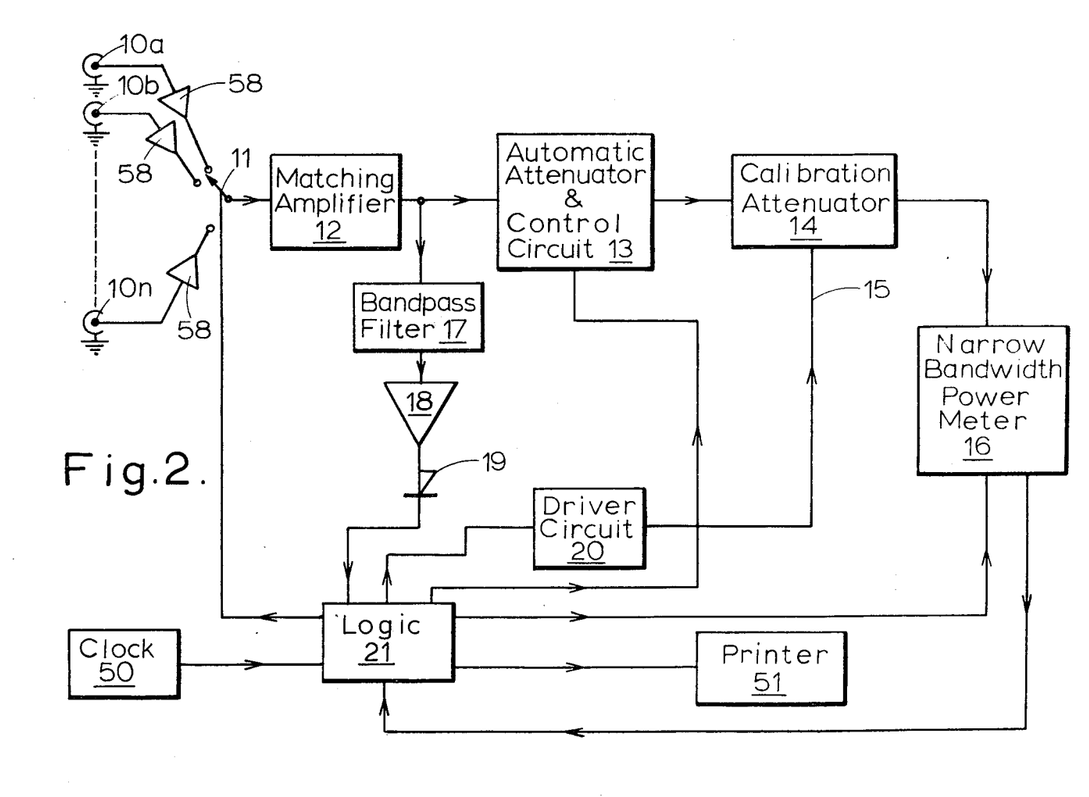
FIG. 2 shows schematically a TNR tester.

Referring now to FIG. 2 the TNR measuring device can be connected to a plurality of T-ins 10A, 10B ... 10N which are connected to a plurality of N radio links. The TNR measuring device can be made to look at each system in turn as will be described hereinafter. Switch 11 is used to select a particular system for measurement. The output signal from the system selected is then passed to a matching amplifier 12 which has a high input impedance and a low output impedance. This ensures that the measuring device has a minimal effect on the system under investigation. In addition matching amplifiers 58 are provided to counteract losses to the system which might be induced by cables connecting the various systems to the TNR tester. The amplifiers 58 have a high input impedance. The output of matching amplifier 12 which includes the whole frequency baseband bandwidth transmitted over the communications link under investigation is then fed to automatic attenuator 13. Automatic attenuator 13 is controlled by a servo feedback loop which will be described later with reference to FIG. 3. The output of automatic attenuator 13 is maintained at a fixed level, namely −29 dBm. The output from the automatic attenuator 13 is then passed via a calibration attenuator 14 which passes the signal to unit 16 either unattenuated, or attenuated by 3 dB, depending on the signal received on line 15 (to unit 16). In unit 16 the power in the selected quiet channels is measured and a value of TNR derived. The operation of unit 16 will be described with reference to FIG. 4 of the drawings. Calibration attenuator 14 is controlled by means of band pass filter 17, amplifier 18, detector 19, and driver circuit 20. Bandpass filter 17 is set to detect a frequency of 8.5 MHz. This frequency is a pilot frequency which is always present on 960 channel systems. If the 8.5 MHz signal is passed by bandpass filter 17, it is amplified by amplifier 18, detected by detector 19, and actuates driver circuit 20 via logic 21. Driver circuit 20 then causes the calibration attenuator to switch in the 3 dB attenuation. The use of this additional attenuator is necessary in order to compensate for differences between 1800 and 960 channel systems. The scanning operation of the measuring device is controlled by logic block 21 which is of completely conventional design. Logic block 21 controls among other things the switch 11 which scans the various systems being studied. In addition logic block 21 controls the operation of unit 16. If a signal indicating which communications link, at a switching centre in which the TNR measuring device is being used, is a 960 channel link and which is a 1800 channel link, this signal may be used to actuate driver circuit 20 via logic 21. Under these circumstances the control loop comprising filter 17, amplifier 18, detector 19, and drive circuit 20 may be dispensed with. The timing for logic 21 is supplied from a master clock 50, and the results of measurements are fed by logic 21 to a printer 51, so that the results are recorded in a printed form.

Figure 3:
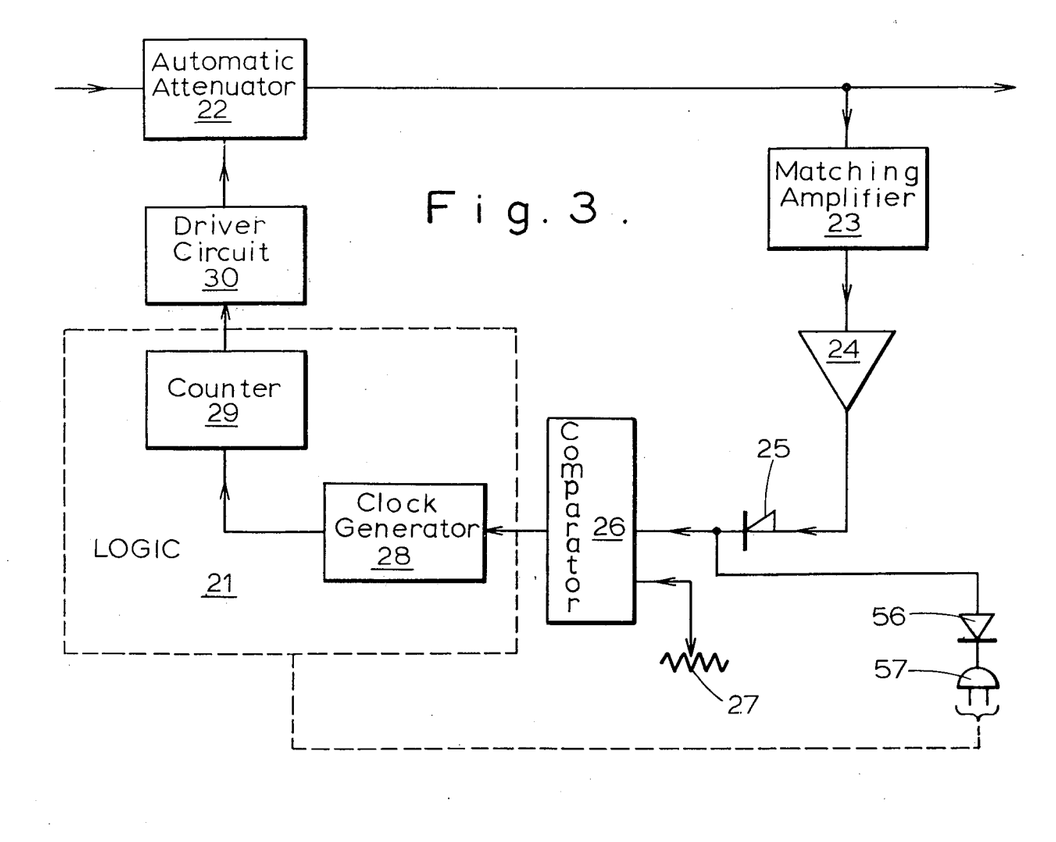
FIG. 3 shows the feedback loop for controlling an automatic attenuator forming part of the TNR tester shown in FIG. 2.

Referring now to FIG. 3 the control circuit for automatic attenuator 13 is shown. The output of the attenuator 22 is connected to a matching amplifier 23 which has a high input impedance and a low output impedance to minimise the effect of the control loop on the output of the automatic attenuator. The output of matching amplifier 23 is connected via amplifier 24 to detector 25. The output of detector 25 is then compared in comparator 26 with a fixed reference level produced by reference generator 27. When the output of detector 25 equals the output of reference generator 27, the output of the attenuator 22 is equal to −29 dBm. The output of comparator 26 is then fed to a clock generator in logic block 21. As long as the two inputs of the comparator are not equal the clock generator is enabled and generates clock pulses. When the two inputs of comparator 26 become equal then the clock generator is switched off and nor more pulses are generated. The clock pulses generated by clock generator 21 are counted in counter 29, in logic block 21, which also has a visual display. The contents of counter 21 are used to actuate a driver circuit 30 which switches the attenuator 22 in stepwise manner as the count changes. Thus any deviation of the output of attenuator 22 from −29 dBm will cause the attenuator to be adjusted via the servo loop to restore the output level. However during a test the detector 25 is effectively disconnected by diode 56 and NAND gate 57 whose operation are discussed later. This means that no change to the attenuator 22 occurs during test even if the traffic level changes.

Figure 4:
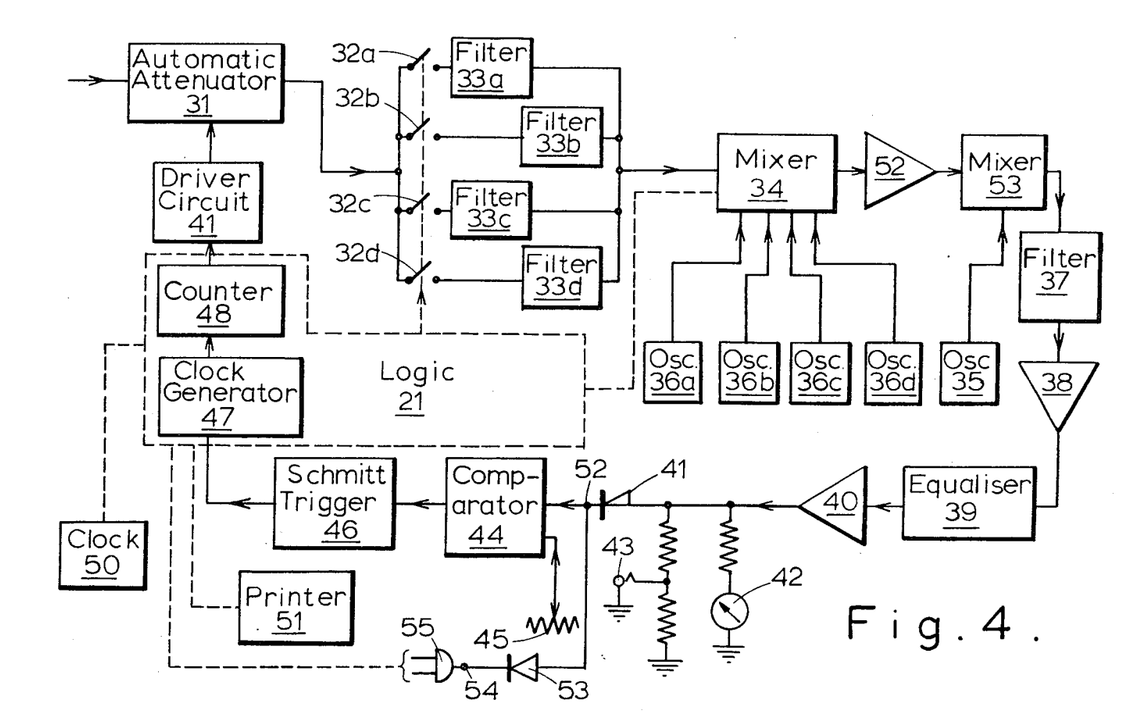
FIG. 4 shows the narrow bandwidth power measuring device for use in the TNR tester shown in FIG. 2.

Referring now to the unit 16, see FIG. 4, which measures the power within the bandwidth of the quiet channel. This comprises an automatic attenuator 31 which receives the broad band signal from the system under test after it has been attenuated by automatic attenuator 13 and calibration attenuator 14. The input to automatic attenuator 31 is thus always maintained at the same level namely −29dBm for an 1,800 channel system and 32 dBm for a 960 channel system. The output of automatic attenuator 31 is then passed via four switches 32a . . . 32d to four filters 33a . . . 33d. These filters isolate the quiet channels for a system under test. In fact for a given system under test only three quiet channels are used. Four filters are required however because of the difference in the frequencies of the quiet channels on 960 channel systems and 1,800 channel systems. The switches 32a . . . 32d are controlled by means of logic block 21 so that each of the three quiet channels are looked at in turn. As previously described logic block 21 receives a signal to indicate whether the particular system being looked at is an 1,800 channel system or a 960 channel system, and this signal enables the logic block to determine which three of the four filters 33a . . . 33d should be switched in. After passing through the filters the signal, which now consists of a narrow band of frequencies due to noise, intermodulation, and cross-modulation are passed to mixer unit 34. Mixer unit 34 comprises four individual mixer circuits each fed by one of the oscillators 36a . . . 36b. The output of mixer unit 34 is an intermediate frequency of 455 KHz for all mixers in mixer unit 34. This intermediate frequency is passed to intermediate frequency amplifier 52, and thence to a second mixer 53, fed by an oscillator 35. The output of mixer 53 is an audio frequency signal. This signal is fed via filter 37 and amplifier 38 to equaliser circuit 39. Equaliser circuit 39 consists of a bank of sets of four potentiometers which are used to equalise for differences in cable length used to connect the test set to the various systems under test. (Each set of four potentiometers corresponds to one system). The output of equaliser 39 is fed to amplifier 40 and thence to detector 41 where the signal is rectified. Meter 42 is provided for use in calibration of the tester and also for monitoring the device performance. A head-phone jack 43 is provided to enable the signal processed by the tester to be monitored to determine that the channel is in fact a quiet channel and there is no speach on it. The output of detector 41 is fed to comparator 44 which also receives a reference signal generated by reference generator 45. The value of the reference signal is determined by a calibration operation to be described later. The output of comparator 44 is fed to Schmitt trigger 46. The output of Schmitt trigger 46 indicates whether the inputs to comparator 44 are equal or not, and is used to control clock generator 47, located in logic block 21. If the comparator inputs are not equal, the output of Schmitt trigger 46 enables the clock generator 47. If there is no output from Schmitt trigger 46 because the inputs to comparator 44 are equal, then clock generator 47 produces no clock pulses. Clock pulses generated by clock generator 47 are fed to counter 48, which has a visual display. The output of counter 48 is used to actuate a driver circuit 41 which controls automatic attenuator 31. Thus the attenuation of automatic attenuator 31 decreases in stepwise manner until the input to comparator 44 are equal. Thus the display of counter 48 is an indication of the total power in the selected quiet channel due to noise and intermodulation and cross-modulation and this is equal to the TNR value if the tester is correctly calibrated. The power level displayed by counter 48 is of course measured with reference to the preset value of reference generator 45. The TNR values measured are printed, to give a permanent record, by printer 51.

The filters 33a . . . 33d each isolate a related one of four channels. Each channel is 4KHz wide with the carrier arranged at the edge of the channel (lower side band suppression). The signals carried in these channels are detected by superheterodyning with a suitable frequency, generated by oscillators 36a . . . 33b, to produce an intermediate frequency of 455 KHz. This intermediate frequency is amplified and superherodyned with a second frequency, generated by oscillator 35. The intermediate frequency is centred on 455 KHz, but in fact has a bandwidth slightly greater than that of the channel isolated by one of filters 33a . . . .33d, i.e. 4.4 KHz, which equals the pass band of filters 33a . . . 33d. After the signal has been superhetrodyned with a signal of 455 KHz in mixer 53, the output of mixer 53 has a frequency range of 0–2.2 KHz. Note the bandwidth is halved because of fold over from the negative frequency domain into the positive frequency domain. The signal then passes through low pass filter 37 which has a pass band from 0 to 1.1 KHz. Thus the detector 40 is looking at a bandwidth of 2.2 KHz at the centre of the channel selected for examination.

A detector drain circuit, comprising a NAND gate 55, and a diode 53 is connected to the output of detector 41, at node 52 (see FIG. 4). This circuit holds the output of detector 41 at or below 300 mV for certain periods of the measurement cycle. First of all when a measurement is not in progress, the drain circuit is on i.e. the output of detector 52 is held to 300 mV. This prevents spurious pulses upsetting the comparator and thus enabling clock generator 47.

The second period when the detector drain circuit must be actuated is dictated by the detailed operation of automatic attenuator 31 and its control circuit. At the start of a measurement cycle the attenuation of attenuator 31 has its maximum value. The attenuator 31 then has its attenuation reduced by 10dB steps until the output of detector 41 exceeds the reference voltage. When this occurs 10dB of attenuation is switched back into the attenuator and the attenuation is then reduced in 1dB steps until the output of detector 41 just exceeds the reference voltage to the comparator. Thus following completion of the 10 dB step changes, the detector output is high and the detector drain circuit has to be connected to bring down the detector output voltage following the insertion of the 10 dB of attenuation and prior to the start of the 1 dB steps.

The operation of the detector drain is controlled by logic 21 via NAND gate 55. When NAND gate 55 has a logic 0 output, the voltage at node 54 is approximately 300 mV. Thus diode 53 is non-conducting provided the voltage at 52 is below 300 mV. Should the voltage at 52 exceed 300 mV diode 53 conducts and hence the voltage at 52 is limited to 300 mV. When the output of NAND gate 55 is a logic 1 node 54 is at a voltage of 3.3 V. Since in normal operation the output of detector 41 does not exceed 1.5 V, diode 53 is reverse biased and non-conducting so that the drain circuit is off.

A similar circuit comprising a diode 56 and NAND gate 57 operates in the base band attenuation circuit, see FIG. 3. This time however the detector drain circuit is merely used to prevent the effects of spurious pulses, since there is no separate 10 dB and 1 dB counting steps.

As previously stated the operation of the TNR testing device is controlled by means of logic 21. The logic block 21 controls switches 11, 32a ... 32d and mixer unit 34. The logic block also receives a signal to indicate whether the system being looked at is a 960 channel system or an 1,800 channel system. When looking at a given system the logic block sequentially switches in the different filters used for isolating quiet channels, i.e. switches 32a ... 32d. Each filter is connected to the output of automatic attenuator 31 for approximately 13 seconds. After all three slots have been examined, the logic unit allows 5 seconds for clear down and switching to the next system to be tested. The logic block controls switch 11 so that several systems may be scanned sequentially. After the last system has been scanned the logic block automatically ensures that the scan returns to the first channel. Logic block 21 also controls the mixer unit 34 to ensure that the correct mixer is used when a particular one of filters 33a ... 33d is in circuit. The output of the TNR tester may be automatically printed out on a standard print-out system.

Before the instrument is used it is necessary to calibrate it. Two types of calibration must be performed, the first to ensure that the noise power measurement reads correctly in dBm and the second to ensure that cables connecting the TNR tester to individual systems have been properly equalised and any variation in baseband response with frequency compensated for.

The first calibration needs to be performed very rarely after the initial calibration—only when it is suspected that component values, amplifier gains etc., may have drifted. The second calibration needs to be performed whenever the tester is connected to a new system for the first time, or when an old system has been serviced (baseband response may change as a result of servicing).

To carry out the first calibration either a white noise signal, or alternatively pure tones, having an output set to simulate traffic level under peak traffic conditions specified for the system, e.g. −20 dBm is fed to the input of matching amplifier 12. Reference level generator 45 is set to approximately 1 volt, and then the mixer gain of each individual mixer unit 34 is adjusted in turn until a read out of 20 dBm is obtained, from counter 48, for each mixer.

Before the device is used it is necessary to set each of the potentiometers n the equaliser 39 (second calibration). This is done in turn for each system and each quiet channel within a system by adjusting the appropriate potentiometer until the meter 42 indicates that the potentiometer has the correct value. This is usually arranged so that a central reading on the meter is the correct reading.

It is possible to use the TNR measuring device herein described in two ways. Firstly if it is desired to measure the performance of a particular radio link, then the quiet channel used must be isolated at the far end of the link by the insertion of a band stop filter. If the quiet channels are situated immediately adjacent to traffic carrying channels, then this procedure has disadvantages in that the band stop filter will affect transmission over neighbouring channels. Unfortunately the frequencies recommended by the CCIR (International Radio Consultative Committee) for the measurement of NPR are surrounded by traffic carrying channels in radio systems used in the U.K. However, by slight modification of the frequencies of the channels in which measurements are performed, it is possible to carry out these measurements in the guard channels between super groups and hyper-groups. This enables a band stop filter to be used without having too serious an effect on adjacent traffic carrying channels because the guard channels do not carry traffic in any case. It should be noted that the lowest guard channel has a bandwidth of 12 KHz and the higher guard channels have a bandwidth of 8 KHz. This is sufficiently wide for a band stop filter not to interfere with neighbouring traffic carrying channels. If a band stop filter is not used then each of the channels under test must be tied out at the switching centre from which the channels originate. In most cases this will be considerably further away from the measuring point than the end of the radio link. This means that the noise getting onto the system may have originated further back than the radio link. Measurements made in this way give an extremely good indication of the quality of service that a subscriber is receiving. However, such measurements are not particularly valuable in diagnosing faults in a particular radio link.

The TNR measuring device can also be used for measuring the base band response of a system under test. To do this a tone is injected at the send end of the communications link at a level of −37 dBm. The TNR measuring unit detects this tone and measures its level relative to −37 dBm, which is the send level. To enable accurate measurements of base band response to be made automatic attenuator 31, see FIG. 4, changes in 0.1 dB steps. Furthermore an additional filter is provided in unit 33, and additional mixer together with its corresponding oscillator is provided on mixer unit 34, and an additional equalising potentiometer for each system is provided in equaliser 39. This enables a total of five spot frequencies to be examined. These additional components are not shown in FIG. 4.

Figure 5:
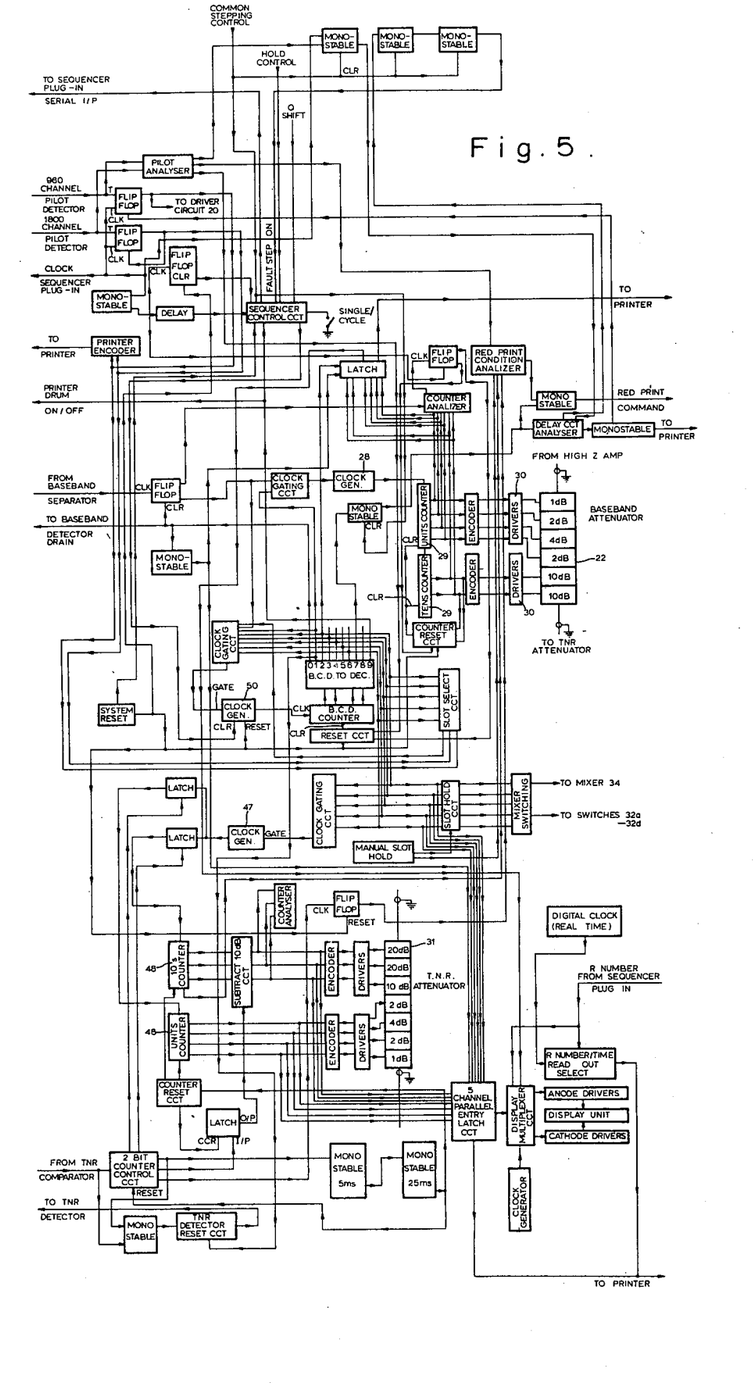
FIG. 5 shows the detailed design of a logic block used to control the TNR tester.

The operation of the TNR tester is controlled by logic block 21 as previously described. The detailed form of this logic block is shown schematically in FIG. 5. The way in which the logic operates is immediately apparent from the drawings, and so will not be described.

What we claim is:

1. Apparatus for assessing the noise performance of a FDM (frequency division multiplex) communications link over which a FDM signal is transmitted, said link over which a FDM signal is transmitted, said apparatus comprising:
   a. input terminal means for extracting a small fraction of the FDM signal,
   b. first automatic attenuator means controlled by a first feed back loop and connected to an output of said input terminal means for attenuating said FDM signal to a predetermined level over a broad bandwidth,
   c. bandwidth limiting means connected via a second automatic attenuator means to an output of said first automatic attenuator means for passing a bandwidth located within a communications channel, and
   d. power measuring means connected to an output of said bandwidth limiting means, including said automatic attenuator means for measuring a noise signal at an output of said bandwidth limiting means.

2. Apparatus as claimed in claim 1 wherein said bandwidth limiting means comprises:
   a. bandpass filter means,
   b. first mixer means connected to an output of said bandpass filter means for superheterodyning an output from said filter means with a first frequency, and
   c. further filter means connected to an output of said first mixer means.

3. Apparatus as claimed in claim 1 wherein bandwidth limiting means comprises:
   a. bandpass filter means,
   b. first mixer means connected to an output of said bandpass filter means for superheterodyning a signal derived from said filter means with a first frequency,
   c. second mixer means connected to an output of said first mixer means for superheterodyning a signal derived from said first mixer means with a second frequency, and
   d. low pass filter means connected to an output of said second mixer means.

4. Apparatus as claimed in claim 3 wherein said power measuring means includes:
   a. rectifier means connected to an output of said second automatic attenuator means via said bandwidth limiting means,
   b. comparator means having a first and a second input terminals and an output terminal, said first input terminal connected to said rectifier means, said second input terminal connected to a reference level generator,
   c. clock generator means enabled by a signal derived from said output terminal of said comparator means, and
   d. counter means connected to an output of said clock generator means, an output of said counter means connected to said automatic attenuator means.

5. Apparatus as claimed in claim 4 wherein said input terminal means includes:
   a. a multi-throw switch means controlled by a logic means for connecting any one of a plurality of communications systems to said first automatic attenuator means, and
   b. matching amplifier means.

6. Apparatus as claimed in claim 5 wherein said first feed back loop includes:
   a. comparator means having a first input terminal connected to an output of said automatic attenuator means via rectifier means, a second input terminal connected to a reference level generator, and an output terminal,
   b. clock generator means enabled by a signal derived from the output terminal of said comparator means, and
   c. counter means connected to an output of said clock generator means, an output of said counter means being connected to said automatic attenuator means.

7. Apparatus as claimed in claim 6 wherein said second automatic attenuator means is connected to said first automatic attenuator means via a calibration attenuator means, controlled by pilot frequency sensing means connected to said input terminal means.

* * * * *